Figure 1:
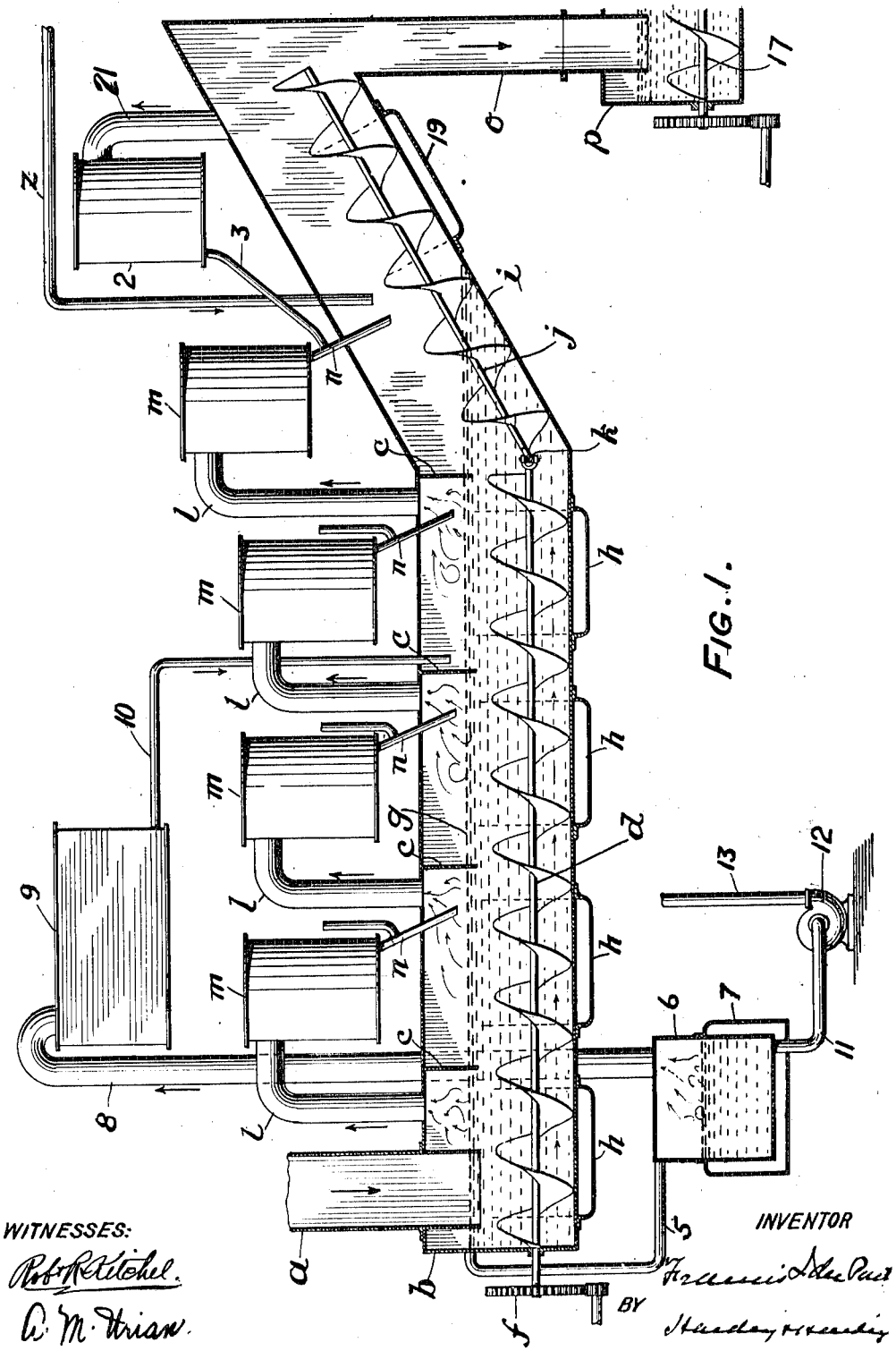

F. I. DU PONT.
PROCESS OF RECOVERING SEPARATING LIQUIDS FROM SEPARATED SOLIDS.
APPLICATION FILED JULY 15, 1910.

1,081,949.

Patented Dec. 23, 1913.

2 SHEETS—SHEET 2.

WITNESSES:

INVENTOR

BY

ATTORNEYS.

BEST AVAILABLE COPY

UNITED STATES PATENT OFFICE.

FRANCIS I. DU PONT, OF WILMINGTON, DELAWARE, ASSIGNOR TO INTERNATIONAL HALOID COMPANY, A CORPORATION OF DELAWARE.

PROCESS OF RECOVERING SEPARATING LIQUIDS FROM SEPARATED SOLIDS.

1,081,949.     Specification of Letters Patent.     Patented Dec. 23, 1913.

Application filed July 15, 1910. Serial No. 572,085.

*To all whom it may concern:*

Be it known that I, FRANCIS I. DU PONT, a citizen of the United States, residing at Wilmington, county of Newcastle, and State of Delaware, have invented a new and useful Improvement in Processes of Recovering Separating Liquids from Separated Solids, of which the following is a full, clear, and exact description, reference being had to the accompanying drawings, which form a part of this specification.

In the gravity separation of solids by means of a liquid, a certain amount of this liquid is carried off with the separated constituents. Where such separation liquid is other than water, it is in most cases too valuable to be lost and some means should be provided, if the process is to be carried on economically, to recover said liquid from the solids which carry it so that it may be returned again to the separating vessel. I have used certain bromids for such separating liquid, and in carrying out my investigation with respect to such separation by such liquids, I discovered that antimony bromid and tin bromid or a mixture of the two or such bromid liquid was soluble in alcohol, and therefore, by passing the material carrying such separating liquid through the alcohol, I could dissolve out from the solids the bromids which were carried by said solids. Further, as the volatilization temperature of the alcohol is considerably lower than that of the bromids, I could subject such solution to the action of heat sufficient to volatilize the alcohol but insufficient to volatilize the separating liquid. As a consequence, the separating liquid could be removed from the solids and its solvent then removed from it, leaving the gravity liquid which could be then returned to the tank.

Therefore my invention broadly consists in recovering the separating liquid carried off by the separated material by subjecting the material to the action of a solvent of the separating liquid, and of lower volatilization temperature than the separating liquid, and then volatilizing the solvent and recovering the separating liquid.

In carrying out this process, I carry on the process in the following manner. I use a tank which is air-tight and which is divided into liquid sections. The liquid is caused to circulate in this tank through the sections in one direction while the material carrying the separating liquid is caused to travel through said tank in the opposite direction. In this operation the liquid in the first section of the tank dissolves more of the gravity liquid from the material than the succeeding section, and this is true with respect to each succeeding section. Therefore, it is necessary that the solvent liquid should be purer as the quantity of the gravity liquid in the separated material becomes less. It is for this reason that I divide the tank into sections, and I provide each section with a heating apparatus sufficient to volatilize the alcohol but insufficient to volatilize the gravity liquid. The volatilized solvent from each section is carried to a condenser and returned to the tank at a section nearer the exit end for the solids of the tank or more remote from the liquid discharge end of the tank. This not only produces a condition of providing the purest alcohol nearest the point of exit of the solids, and so gradually down to the liquid discharge of the tank, but also creates a flow of the liquid in the tank or section of the tank in a direction opposite to the travel of the solid material.

I will now describe the embodiments of my invention and then fully point out the invention in the claims.

Figure 2:
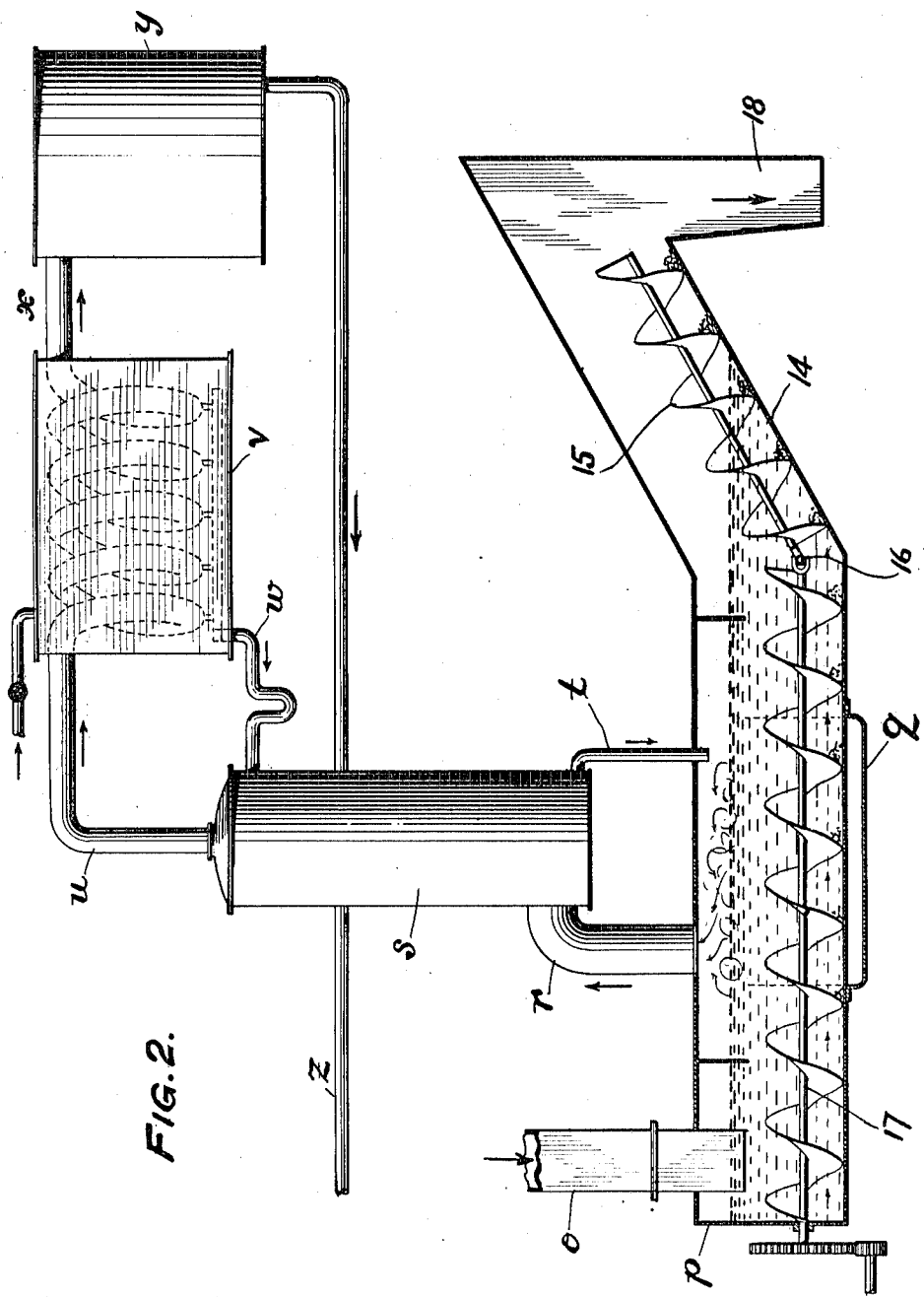

In the drawings—Figures 1 and 2 are side elevations, partly in section, of an apparatus embodying my invention and adapted to carry out my process.

*a* is a chute into which the separated material from the gravity separator passes. This chute enters the tank *b*, which is a closed tank and divided into liquid sections by the partitions *c*. In this tank is a conveyer *d* driven by the gear *f*. In this tank is a liquid *g* which, if the gravity liquid be a bromid, is alcohol.

*h, h, h, h,* are heaters, one for each section of the tank. The heat applied to each section is such as to volatilize the solvent liquid but is less than that necessary to volatilize the separating liquid.

At the right hand end of the tank is an upwardly inclined portion $i$ in which is a conveyer $j$ having, with the conveyer $d$, the driving connection $k$. Each section of the tank has a pipe $l$ in connection with a condenser $m$, and a pipe $n$, an outlet from said condenser $m$. The pipe $n$ enters the tank $b$ at a succeeding section from that which the pipe $l$, leading to the corresponding condenser $m$, opens. At the end of the upwardly inclined portion $i$ is the chute or channel $o$ leading to the secondary tank $p$ which contains water or a liquid, and is provided with a heater $q$. From this tank leads the pipe $r$ to the rectifier $s$ provided with the drip pipe $t$. From the rectifier the pipe $u$ leads to the analyzer $v$, the lower portion of which is connected by the pipe $w$ with the rectifier $s$. A pipe $x$ leads from the upper part of the analyzer $v$ to the condenser $y$ and $z$ is a return pipe for the condensed vapors and leading to an opening into the upwardly inclined portion $i$. Connected to the upwardly inclined portion $i$ of the bank is the pipe 21 leading to the condenser 2, provided with the return pipe 3 leading back to the liquid in the tank $b$.

5 is the liquid outlet from the tank $b$, which leads to the receiving vessel 6 which is jacketed by the jacket 7. From this receiving vessel 6 a pipe 8 leads to the condenser 9, from which a return pipe 10 leads to the first section of the tank $b$. From the lower portion of the vessel 6 a pipe 11 leads to the pump 12 from which a pipe 13 leads back to the separating device (not shown).

The operation is as follows: The separated material carrying some of the separating liquid, say a bromid, passes down the chute or channel $a$ into the tank $b$ where it is caught by the conveyer $d$ and caused to travel from left to right in the sections of the tank. In the first section, the material containing at that point the greatest amount of the separating liquid, a large quantity will be readily dissolved by the alcohol which is the liquid in the tank. This is true in degree with respect to all of the sections. The heater $h$ in each section will vaporize the alcohol, causing it to pass through the condenser $m$ and return to the next forward section (in the direction of movement of the solid material). In this way there will be a constant flow of the alcohol in a reverse direction to the movement of the solids so that practically the first movement of the alcohol when it is in the purest condition will be upon the material at the time in which it carries the least amount of the gravity liquid, which is, of course, desirable, and the alcohol will be slightly less pure in the next case where there is less action, and so on to the outlet pipe 5, or the section nearest the outlet pipe, which section will contain all or practically all of the solvent in the separated material. This liquid will pass out through the pipe 5 into the vessel 6 where, by means of the jacket 7, any alcohol carried out therewith will vaporize, pass out through the pipe 8, be condensed in the condenser 9, and be returned by pipe 10 to the right hand section.

The temperature of the heater $h$ for each section of the tank should be sufficient to equal the boiling point of the liquid used, which in this case, as stated, is alcohol, which boils at 78° C. However, as the liquid in the bath becomes more contaminated as it passes to the liquid discharge end in the direction of the current, the actual temperature will vary, increasing in temperature in the direction of the current liquid flow. Thus the initial heater in the direction of the current flow of the liquid should be at least 78 degrees, the temperature of the next heater should be at least in excess of 78 degrees, sufficient to keep the liquid boiling. This follows all the way through. In fine, the temperature of each of the heaters should be such as at least to boil the liquid at the point where the heat is applied. Of course, I do not intend to limit myself to the entry of this pipe into the particular section as shown, as it may be caused to enter any one of the sections desired. The gravity liquid will pass out from the vessel 6 through the pipe 11 into the pump 12, from which it will be pumped through the pipe 13 back to the separating vessel.

It may be noted that the volatilized product carried by the right hand pipe $l$, passing into its condenser $m$, will return into the wing, but it will be seen that it returns into the wing at the level of the liquid in the tank $b$, thereafter passing into the liquid of that tank.

In order to recover from the solids any alcohol which may be carried by them, I provide in the upwardly inclined portion the heating jacket 19, the pipe 21 and the condenser 2 and return pipe 3, which return pipe 3 enters the pipe $n$ of the right hand condenser $m$, and thus the alcohol is delivered again into the liquid of the tank.

In the vessel or tank $p$ is, as stated, water and the solids passing down the chute $o$ will pass into this water, which will remove any final trace of alcohol, which final trace, by the heater $q$, will be volatilized, pass up through the rectifier $s$, through analyzer $v$ and into a condenser $y$, from which, through pipe $z$, it will be returned to the liquid in the tank $b$. Finally, the tank $p$ has an inclined wing 14 with the conveyer 15 operatively connected by universal joint 16 with the conveyer 17, and flows into the chute 18 through which it may be carried to the desired point.

Having now fully described my invention, what I claim and desire to protect by Letters Patent is:—

1. The hereinbefore described method of recovering the liquid used in gravity liquid separation carried off by the separated material, which consists in passing the separated material in one direction through a tank containing a liquid which is a solvent of the separating liquid and which has a lower volatilizing point than the gravity liquid, creating a liquid current in a direction opposite to that of the material, subjecting the liquid at a plurality of points to the action of heat sufficient to volatilize the solvent but insufficient to volatilize the gravity liquid, separately condensing such solvent vapors evolved at each point of volatilization and separately returning said condensed solvent.

2. The hereinbefore described method of recovering the liquid used in gravity separation carried off by the separated material, which consists in passing the separated material in one direction through a multi-section tank containing a liquid which is a solvent of the gravity liquid and which has a lower volatilizing point than the gravity liquid, creating a liquid current in a direction opposite to that of the separated material, subjecting the liquid at different sections to the action of heat sufficient to volatilize the solvent, but insufficient to volatilize the gravity liquid, separately condensing such solvent vapors and separately returning such condensed solvent respectively to sections of the tank more remote from the liquid outlet.

3. The hereinbefore described method of recovering the liquid used in gravity liquid separation carried off by the separated material, which consists in subjecting the separated material carrying such liquid to the action of a liquid of lower volatilizing point than the gravity liquid and in which said gravity liquid is soluble, and subjecting said mixed solution at different points to the action of heat sufficient to volatilize said solvent liquid but insufficient to volatilize the gravity liquid, separately condensing said vapor and separately returning the solvent to the tank at different parts therein.

4. The hereinbefore described method of recovering the liquid used in gravity liquid separation carried off by the separated material, which consists in passing the separated material carrying such liquid through a liquid of lower volatilizing point than the gravity liquid and having a lower volatilizing point than water, and in which said gravity liquid is soluble, causing the liquid to move in the opposite direction to that of the material, subjecting said liquid to the action of heat sufficient to volatilize the solvent but insufficient to volatilize the gravity liquid, removing the gravity liquid so separated, and then passing the separated material through water and vaporizing any solvent and condensing the solvent and returning it to the main body of the liquid.

5. The hereinbefore described method of recovering the liquid used in gravity liquid separation carried off by the separated material, which consists in passing said material through a liquid which is a solvent of the gravity liquid and of lower volatilizing point than said gravity liquid, moving the solvent liquid in a direction opposite to that in which the material passes, volatilizing the solvent at a plurality of points, separately condensing the vapor volatilized at each point and separately returning the condensation product at each point to the body of liquid at points, in the direction of the passage of the separated material, remote from its point of volatilization.

6. The hereinbefore described method of recovering the liquid used in gravity liquid separation carried off by the separated material, which consists in passing said material through a liquid which is a solvent of the gravity liquid and of lower volatilizing point than said gravity liquid, moving the solvent liquid in a direction opposite to that in which the material passes, decreasing the strength of solvent in the direction of movement of the solvent liquid, separately volatilizing the solvent at a plurality of points, separately condensing the vapor produced at each point and separately returning the vapor condensed at each point to the body of liquid at a point, in the direction of the passage of the separated material, remote from its point of volatilization.

7. The hereinbefore described method of recovering the liquid used in gravity liquid separation carried off by the separated material, which consists in passing said material through a liquid which is a solvent of the gravity liquid and of lower volatilizing point than said gravity liquid, moving the solvent liquid in a direction opposite to that in which the material passes, the strength of said solvent liquid decreasing in the direction of the movement of said solvent liquid, volatilizing the solvent at a plurality of points, separately condensing the vapor at each point of volatilization and returning each condensation to the body of liquid at a point, in the direction of the passage of the separated material, remote from its point of volatilization.

8. The hereinbefore mentioned method of recovering the liquid used in gravity liquid separation, which consists in washing the solids in a liquid more volatile than the separating liquid and in which said liquid is soluble, removing the washed solids from the washing liquid and subjecting them to heat sufficient to drive off the major portion of the washing liquid, and finally immersing them in a liquid of higher volatilizing point than the washing liquid, and maintained at a temperature above the volatilizing point of said washing liquid, and recovering by condensation the washing liquid.

9. The hereinbefore mentioned method of recovering the liquid used in gravity liquid separation, which consists in washing the solids in a liquid more volatile than the separating liquid and in which said liquid is soluble, removing the washed solids from the washing liquid and subjecting them to heat sufficient to drive off the major portion of the washing liquid, and finally immersing them in a liquid of higher volatilizing point than the washing liquid, and maintained at a temperature above the volatilizing point of said washing liquid, and recovering by condensation the washing liquid, and separating by distillation of the washings the washing liquid from the separating liquid.

10. The hereinbefore mentioned method of recovering a liquid soluble in alcohol used in gravity liquid separation of solids, which consists in washing the solids after separation in alcohol, removing them from the alcohol and subjecting them to heat sufficient to volatilize the major portion of the alcohol and finally immersing them in boiling water, condensing the alcohol driven off and by means of a rectifying system recovering the last traces of alcohol from the vapors of the boiling water.

11. The hereinbefore mentioned method of recovering a liquid soluble in alcohol used in gravity liquid separation of solids, which consists in washing the solids after separation in alcohol, removing them from the alcohol and subjecting them to heat sufficient to volatilize the major portion of the alcohol and finally immersing them in boiling water, condensing the alcohol driven off and by means of a rectifying system recovering the last traces of alcohol from the vapors of the boiling water, and separating by distillation the alcohol from the separating liquid.

12. The hereinbefore mentioned method of recovering the liquid used in gravity liquid separation, which consists in washing the solids in a liquid more volatile than the separating liquid and in which said liquid is soluble, removing the washed solids from the washing liquid, and subjecting them to heat sufficient to drive off the major portion of the washing liquid, and finally immersing them in a liquid of higher volatilizing point than the washing liquid, and maintained at a temperature above the volatilizing point of said washing liquid, and recovering by condensation the washing liquid.

13. The hereinbefore mentioned method of recovering the liquid used in gravity liquid separation, which consists in washing the solids in a liquid more volatile than the separating liquid, and in which said liquid is soluble, removing the washed solids from the washing liquid and subjecting them to heat sufficient to drive off the major portion of the washing liquid, and finally immersing them in a liquid of higher volatilizing point than the washing liquid, and maintained at a temperature above the volatilizing point of said washing liquid, recovering by condensation the washing liquid, and separating by distillation of the washings the washing liquid from the separation liquid.

In testimony of which invention, I have hereunto set my hand, at Philadelphia, on this 8th day of July, 1910.

FRANCIS I. du PONT.

Witnesses:
  M. M. HAMILTON,
  A. M. URIAN.